United States Patent
Kusano

(10) Patent No.: US 6,220,844 B1
(45) Date of Patent: Apr. 24, 2001

(54) VULCANIZATION MOLD FOR TIRES

(75) Inventor: Akio Kusano, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/070,874

(22) Filed: May 1, 1998

(30) Foreign Application Priority Data

May 6, 1997 (JP) .................................................. 9-115616

(51) Int. Cl.⁷ .................................................. B29C 35/02
(52) U.S. Cl. .................. 425/46; 152/209.2; 425/28.1
(58) Field of Search .................. 425/28.1, 46; 152/209.2

(56) References Cited

U.S. PATENT DOCUMENTS

| | | | | |
|---|---|---|---|---|
| 3,989,780 | * | 11/1976 | Vorih | 425/29 |
| 4,823,853 | * | 4/1989 | Kitzky | 152/209.2 |
| 5,062,461 | * | 11/1991 | Noguchi | 152/209.2 |
| 5,120,209 | * | 6/1992 | MacMillan | 425/46 |
| 5,223,065 | * | 6/1993 | Kogure | 425/46 |
| 5,234,326 | * | 8/1993 | Galli et al. | 425/46 |
| 5,240,054 | * | 8/1993 | Kogure | 152/209.2 |
| 5,309,964 | * | 5/1994 | Kogure | 152/209.2 |
| 5,314,551 | * | 5/1994 | Williams | 152/209.2 |
| 5,383,506 | * | 1/1995 | Kogure | 152/209.2 |
| 5,394,916 | * | 3/1995 | Williams | 152/209.2 |
| 5,769,990 | * | 6/1998 | Hoffmeister | 425/46 |

FOREIGN PATENT DOCUMENTS

| | | | |
|---|---|---|---|
| 0579436 A1 | | 1/1994 | (EP) . |
| 524568 | * | 4/1996 | (EP) . |
| 528577 | * | 12/1996 | (EP) . |

* cited by examiner

Primary Examiner—James P. Mackey
(74) Attorney, Agent, or Firm—Sughrue, Mion, Zinn, Macpeak & Seas, PLLC

(57) ABSTRACT

There is provided a vulcanization mold for a pneumatic tire having a lug type or rib-lug type tread pattern, wherein a portion of the mold contributing to the formation of the tread pattern is comprised of many segments of n types (n=2 to 4), and these segments are combined so as to have at least (n+1) types of pitches each defined by an interval between mutual adjoining protrusions located on the same circumference and a difference between mutual pitches of not less than 0.5 as an index when a maximum value of the pitch is 10.

2 Claims, 4 Drawing Sheets

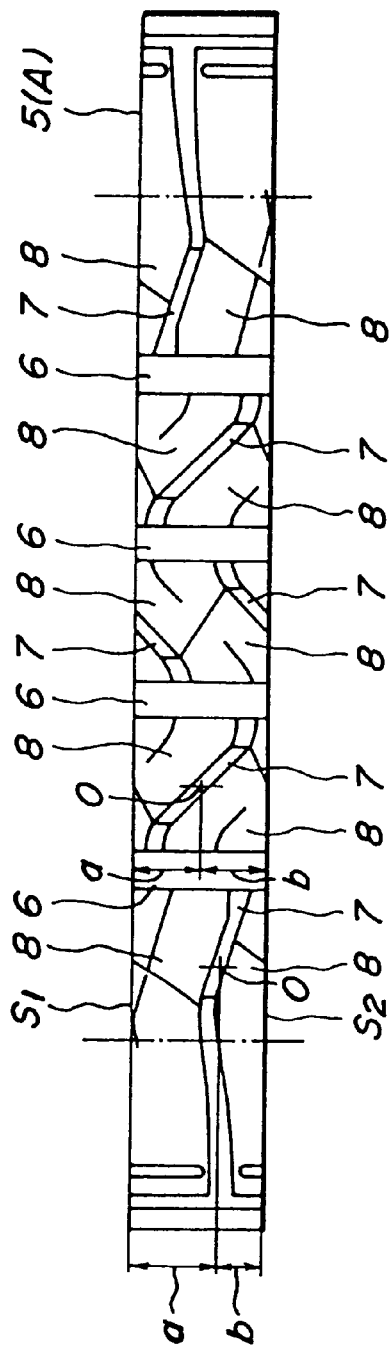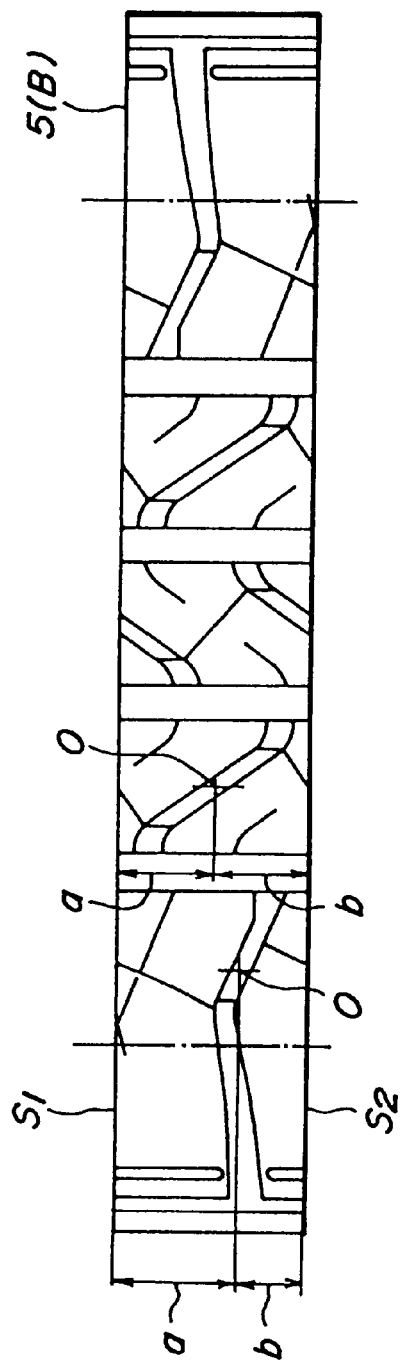

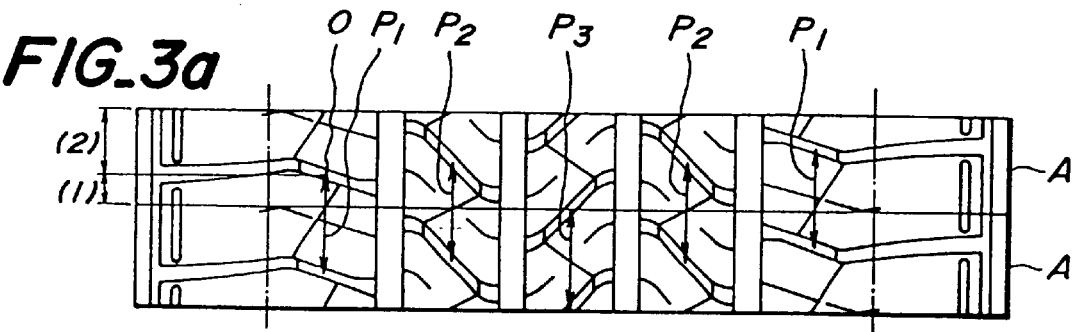
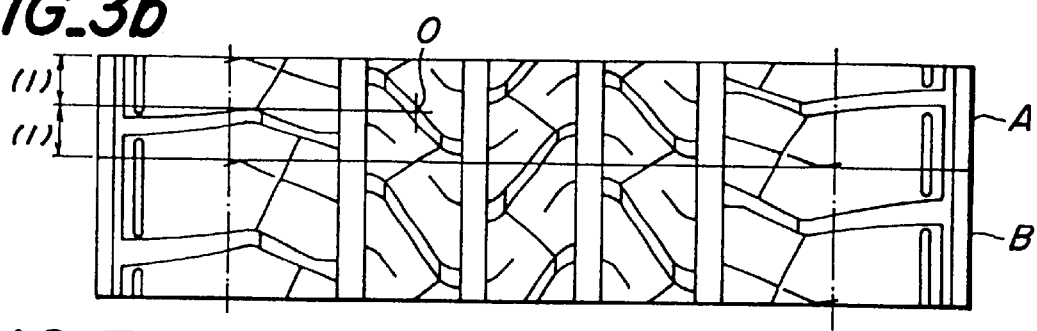
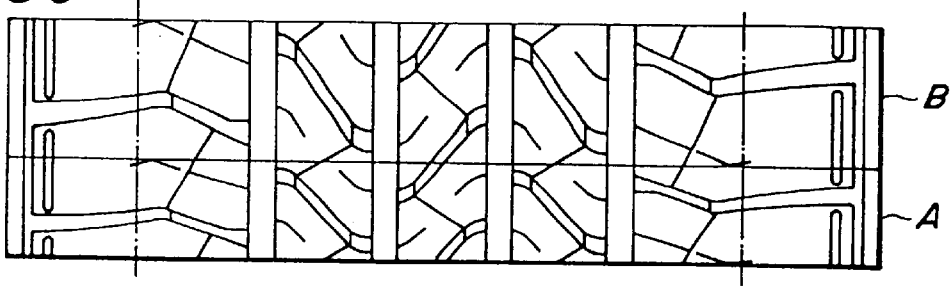
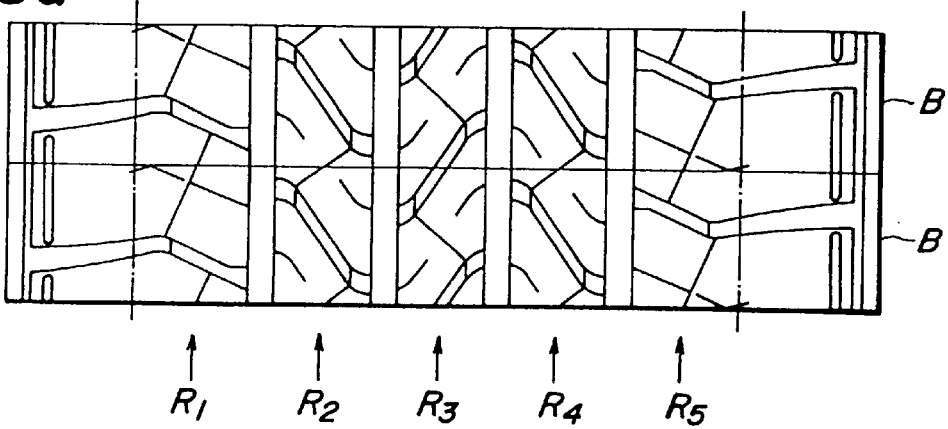

VULCANIZATION MOLD FOR TIRES

BACKGROUND OF THE INVENTION

1. Filed of the Invention

This invention relates to a mold for vulcanization building of a tire. More particularly, it relates to a mold suitable for the vulcanization building of the tire introducing so-called pitch variation into a tread pattern for reducing pattern noise during the running of the tire.

2. Description of Related Art

Since pattern noise resulting from the tread pattern largely occupies various tire noises, it is common to form a pitch variation in the tread pattern for reducing such pattern noise. In this case, the tread pattern is comprised of elements having a telescopic shape in only a circumferential direction of the tread, wherein a circumferential length ratio between the elements is varied by changing circumferential lengths of these elements and designing an arrangement of these elements, whereby a frequency characteristic of the pattern noise is flattened to reduce the noise.

The tire having such a pitch variation can be manufactured with a vulcanization mold wherein a portion of the mold contributing to the formation of the tread pattern is comprised of many segments of plural types having different circumferential lengths partitioned by partition lines in a widthwise direction of the mold, each of which lengths corresponds to each element constituting the tread pattern. In this case, it is required to combine the segments of the same types as the number of pitches formed in the pitch variation. At the present, it is generalized to arrange the elements of 4 or more types randomly or periodically as the tread pattern, so that it is obliged to increase the number of segment types used in the mold.

In the manufacture of these mold segments, an enormous cost and considerable labor are required, so that there is caused a problem contrary to the above. Particularly, there is caused a problem in the vulcanization mold for the manufacture of tires having grooves (lug grooves) extending across an equatorial plane of the tire or so-called rib-lug or lug type tread pattern.

That is, when a tread pattern is formed by defining land portions by at least one circumferential groove extending along a circumference of a tread and both tread ends and arranging many lug grooves extending across the circumferential groove in the land portion in the circumferential direction of the tread, the mold is required to have a structure that segments are partitioned at positions excluding protrusions for the formation of the lug grooves. Because, when a partition line between adjoining segments is existent on the protrusion, the outgassing and rubber flow are created at this partition line during the vulcanization and the formation of a groove bottom is not carried out by the protrusion as is expected. Hence there are caused the lowering of cut resistance and resistance to groove crack due to the decrease of rubber gauge at the lug groove bottom, occurrence of cracks from a partition position of the segment at the lug groove bottom and chipping of blocks accompanied therewith. Also, the formation of the protrusion extending between adjoining segments requires a higher technique for the manufacture of the mold, which undesirably increases cost.

Therefore, the protrusion for the formation of the lug groove is required to locate in each of the segments. However, if it is intended to form the lug type or rib-lug type tread pattern by the mold having such segments, there is a problem that the resulting tire does not develop the effect of the given pitch variation as is designed.

In the tread pattern having lug grooves, the most effective means for reducing the pattern noise is a change of interval between adjoining mutual lug grooves arranged on the same circumference from each other, and a pitch variation is designed based on this technical concept. In fact, the pitch variation is formed by combining segments having different circumferential lengths. However, such a pitch variation is not sufficiently reflected to the interval between the lug grooves because the lug groove is not formed in correspondence with the partition line between the segments as mentioned above and hence the circumferential length of the segment itself does not correspond to the interval between the lug grooves. Particularly, when the pitch variation is formed by combining segments types having a small difference in circumferential length between mutual segments, the interval between the lug grooves decreases from the circumferential length of the segment and hence the sufficient pitch variation is not formed. As a result, the interval between the lug grooves is largely remote from the designed pitch variation and hence the expected reduction of pattern noise is not attained.

SUMMARY OF THE INVENTION

It is, therefore, an object of the invention to provide a mold realizing the formation of a pitch variation based on intervals between lug grooves even by using segments of a few types, about 2 to 4 types.

According to the invention, there is the provision of a vulcanization mold for a tire having a tread pattern formed by defining land portions by at least one circumferential groove extending along a circumference of a tread and both tread ends and arranging many lug grooves extending across the circumferential groove in the land portion in a circumferential direction of the tread, wherein a portion of the mold contributing to the formation of the tread pattern is comprised of many segments of n types selected from 2 to 4 different segments having a similar telescopic shape in the circumferential direction defined by partition lines extending in a widthwise direction of the mold. These segments are combined to have at least (n+1) types of pitches each defined by an interval between mutual adjoining protrusions located on the same circumference line and a difference of pitch between mutual sets of pitches of not less than 0.5 as an index when a maximum value of the pitch is 10.

In a preferable embodiment of the invention, when the protrusion is disposed in a concave portion of the segment forming a land portion of a tread, a ratio of circumferential length a from a center of the protrusion in longitudinal direction to a partition line defining the segment to circumferential length b from this center to another partition line defining the segment differs between adjoining concave portions in at least a widthwise direction of the segment.

BRIEF DESCRIPTION OF THE DRAWINGS

The invention will be described with reference to the accompanying drawings, wherein:

FIGS. 2a and 2b are schematic views illustrating a shape of inner walls of segments constituting the mold;

FIGS. 3a–3d are diagrammatic views illustrating a combination of segments;

DESCRIPTION OF PREFERRED EMBODIMENTS

Figure 1:
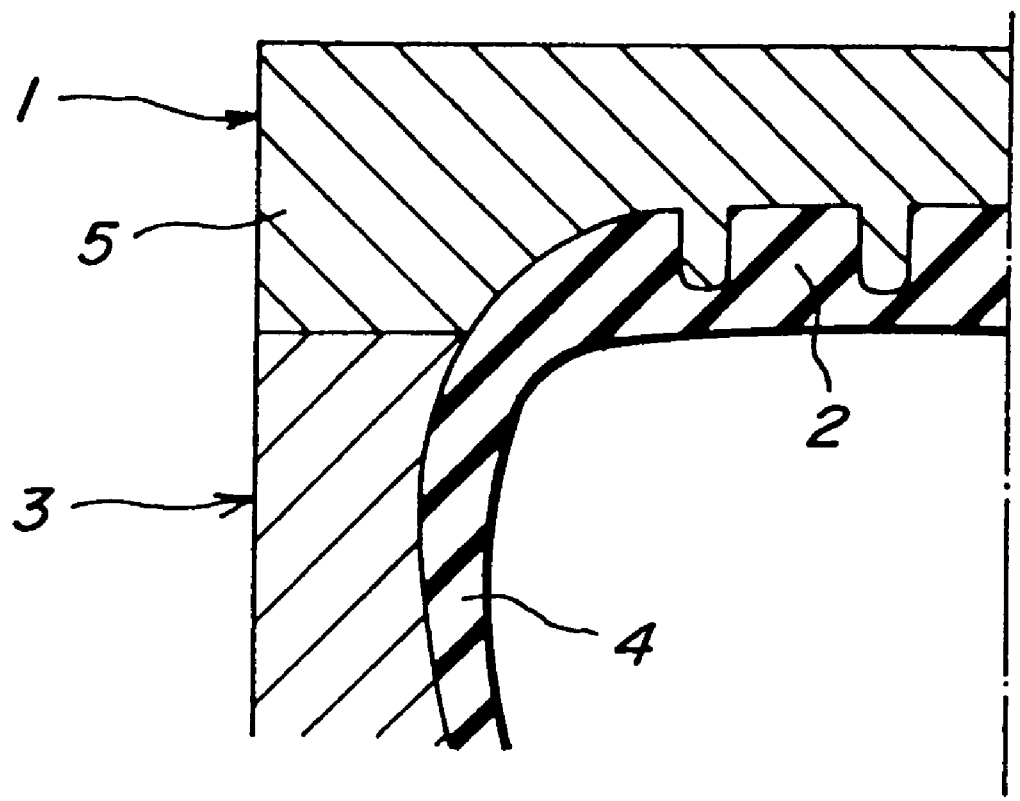
FIG. 1 is a diagrammatically partial section view of an embodiment of the mold according to the invention.

In FIG. 1 is shown a mold according to the invention, wherein numeral 1 is a tread ring forming a tread 2 of a tire and numeral 3 a side ring forming a sidewall 4 of the tire. The tread ring 1 is comprised of many segments 5 of n types selected from 2 to 4 different segments having a similar telescopic shape in a circumferential direction defined by partition lines extending in a widthwise direction of the mold.

The segment 5 has an inner wall of a shape rendering into a female mold for the tread pattern. For example, segments of two types have inner wall shapes telescopically similar to each other as shown in FIGS. 2a and 2b. In FIG. 2, numeral 6 a projection for forming a circumferential groove in the tire tread 2, numeral 7 a protrusion for forming a lug groove in the tread and numeral 8 a concave portion for forming a land portion of the tread.

The words "segments have similar telescopic shape in circumferential direction" used herein means that a ratio of circumferential length a from a center O of the protrusion 7 in longitudinal direction to a partition line $S_1$, of the segment 5 to circumferential length b from the center O to another partition line $S_2$ is the same, for example, between the segment shown in FIG. 2a and the segment shown in FIG. 2b every a row of the concave portions 8 arranged on the same circumference. In each of the segments 5, the protrusion 7 is not existent on the partition lines $S_1$, and $S_2$ between the mutual segments as previously mentioned, but if it is intended to form a tread pattern having lug grooves arranged obliquely with respect to an equatorial plane of the tire, the mold may include a case that the protrusion 7 crosses the partition line as in the illustrated embodiment. In case of obliquely arranging the protrusion 7, unless the center 0 of the protrusion 7 in the longitudinal direction overlaps with the partition line, there is not caused a substantial problem because a greater part of the protrusion 7 comes off from the partition line.

Furthermore, it is favorable that the ratio of circumferential length a from the center 0 of the protrusion 7 in longitudinal direction to a partition line $S_1$ of the segment 5 to circumferential length b from the center 0 to another partition line $S_2$ differs between adjoining concave portions 8 in at least a widthwise direction of the segment 5. In the segment shown in FIG. 2a, for example, a:b in a concave portion located in an end region in the widthwise direction is 2:1, while a:b in a concave portion adjacent thereto is 1:1.

When the mold is constructed by adequately combining the segments 5 of the above two types, the combination of both segment A shown in FIG. 2a and segment B shown in FIG. 2b is four sets of A+A, A+B, B+A and B+B as shown in FIGS. 3a to 3d. In each of these sets, a pitch P defined by an interval between mutual adjoining protrusions 7 arranged on the same circumference line varies in accordance with circumferential length ratio between the segments and a/b every concave portion, but the pitches P of 3 to 4 types can be obtained. That is, at least (n+1) type of pitches are obtained by using segments of n-types.

In FIG. 3, for example, when the circumferential length ratio between the segments A and B is 7:10 and a:b in concave portion rows $R_1$ and $R_5$. in an end region of each segment in widthwise direction is 2:1, a ratio of pitches $P_1$ at four sets of A+A, A+B, B+A and B+B is 7:9:8:10. Since a:b in concave portion rows $R_2$ and $R_4$ adjacent to the rows $R_1$ and $R_5$ is 1:1, a ratio of pitches $P_2$ at four sets of A+A, A+B, B+A and B+B is 7:8.5:8.5:10. Similarly, since a:b in a concave portion row $R_3$ is 1:2, a ratio of pitches $P_3$ is 7:9:8:10.

In the invention, it is important that many segments are arranged under a combination of them satisfying a difference of pitch between mutual sets of pitches of not less than 0.5 as an index when a maximum value of the pitch P in the same circumference or in circumferential rows of the concave portions is 10. When the pitch difference is less than 0.5, the difference in the interval between the lug grooves sufficient to reduce the pattern noise is not imparted and hence the effect by the pitch variation can not be obtained.

The following examples are given in illustration of the invention and are not intended as limitations thereof.

Figure 4:
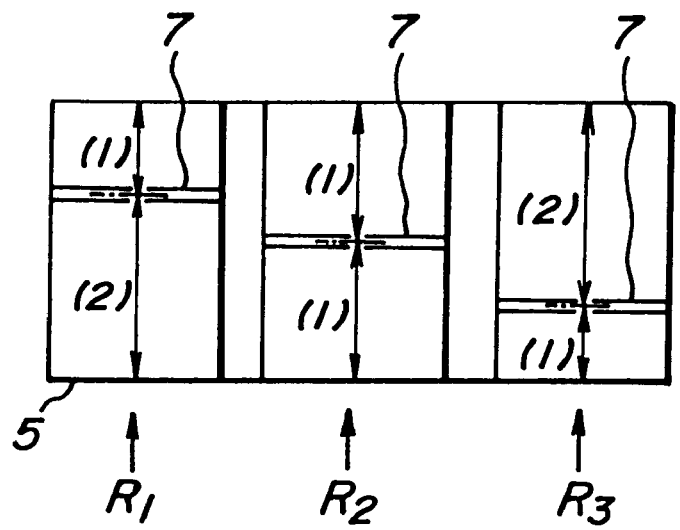
FIG. 4 is a schematic view illustrating a segment for the formation of the tread pattern.
Figure 5:
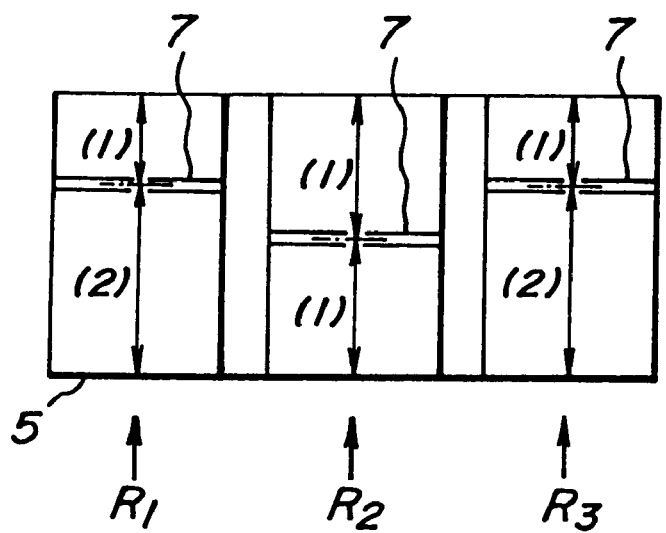
FIG. 5 is a schematic view illustrating another segment for the formation of the tread pattern.

A pneumatic radial tire for passenger car having a tire size of 225/60R15 is vulcanized by using a mold wherein segments of 2–4 types having different circumferential lengths are prepared according to basic shapes of a tread pattern shown in FIGS. 4 and 5 and properly combined to prepare a mold. The specification of each of the prepared molds is shown in Tables 1–4.

TABLE 1

Conventional mold:segment shape:FIG. 4

| | | | Number of segments | | | | | | | | | | | | | | | | | | | | | | |
|---|---|---|---|---|---|---|---|---|---|---|---|---|---|---|---|---|---|---|---|---|---|---|---|---|---|
| Segment | | | | 5 | | | | | 10 | | | | 15 | | | | | 20 | | | | | 25 | |
| type *1 | B | A | A | A | C | D | D | D | B | A | C | D | B | C | B | C | D | D | D | B | A | A | C | D | D |
| Pitch | concave | 7.33 | | 7.00 | | 9.67 | | 10.00 | | 7.33 | | 9.67 | | 8.67 | | 8.67 | | 10.00 | | 8.67 | | 7.00 | | 9.67 | | 8.67 |
| ratio | row $R_1$ | | 7.00 | | 8.33 | | 10.00 | | 8.67 | | 8.33 | | 8.67 | | 8.33 | | 9.67 | | 10.00 | | 7.33 | | 8.33 | | 10.00 | |
| *2 | concave | 7.5 | | 7.0 | | 9.5 | | 10.0 | | 7.5 | | 9.5 | | 8.5 | | 8.5 | | 10.0 | | 9.0 | | 7.0 | | 9.5 | | 9.0 |
| | row $R_2$ | | 7.0 | | 8.0 | | 10.0 | | 9.0 | | 8.0 | | 9.0 | | 8.5 | | 9.50 | | 10.0 | | 7.5 | | 8.0 | | 10.0 | |
| | concave | 7.33 | | 7.0 | | 9.67 | | 10.00 | | 7.33 | | 9.67 | | 8.67 | | 8.67 | | 10.00 | | 8.67 | | 7.00 | | 9.67 | | 8.67 |
| | row $R_3$ | | 7.00 | | 8.33 | | 10.00 | | 8.67 | | 8.33 | | 8.67 | | 8.33 | | 9.67 | | 10.00 | | 7.33 | | 8.33 | | 10.00 | |

TABLE 1-continued

Conventional mold: segment shape: FIG. 4

```
                                                  Number of segments
              Segment           30              35                40                45                50
              type *1       B  A  C      B  C  B  A  A    A  C  D  D  D    B  C  D  D  D    B  C  D  B  A    A  C Pitch  concave  7.33    8.33         8.33   7.00    8.33   10.00   8.67        9.67   10.00    8.67      8.67   7.00       9.67
ratio  row R1          8.33    8.67        7.33   7.00           9.67   10.00         8.67   10.00    8.67        9.67   7.33    8.33
*2     concave  7.5     8.5          8.5    7.0     8.0    10.0    9.0         9.5    10.0     8.5       9.0    7.0        9.5
       row R2          8.0     8.5         7.5    7.0            9.5    10.0          8.5    10.0     9.0         9.5    7.5     8.0
       concave  7.33    8.33         8.33   7.00    8.33   10.00   8.67        9.67   10.00    8.67      8.67   7.00       9.67
       row R3          8.33    8.67        7.33   7.00           9.67   10.00         8.67   10.00    8.67        9.67   7.33    8.33
```

```
                                                  Number of segments
              Segment            55                  60                65                  70
              type *1     D   B  A  C  D     B  A  C  B       C  B  C  D  D      B  C  B  A  C     D   D Pitch  concave  8.67     8.33      8.67          7.00   8.33      8.33    9.67   8.67       8.33   8.33        10.00
ratio  row R1           7.33       9.67  7.33        8.33   8.67        8.67    10.00    8.67      7.33     9.67      8.67
*2     concave  9.0      8.0       9.0           7.0    8.5       8.5     9.5    9.0        8.5    8.0         10.0
       row R2          7.5        9.5   7.5         8.0    8.5         8.5     10.0     8.5       7.5      9.5       9.0
       concave  8.67     8.33      8.67          7.00   8.33      8.33    9.67   8.67       8.33   8.33        10.00
       row R3          7.33       9.67  7.33        8.33   8.67        8.67    10.00    8.67      7.33     9.67      8.67
```

(Note)
*1 Circumferential length ratio of segment types A:B:C:D = 7:8:9:10
*2 Pitch ratio every concave row when maximum value of each concave row is 10.

TABLE 2

Invention mold 1: segment shape: FIG. 4

```
                                              Number of segments
Segment type                 5                 10              15              20              25
     *1          B  A  A  A  A     B  B  B  B  A     A  B  B  A  B     A  B  B  B  B     A  A  B  B Pitch  concave   8   7  7  7  9    10  10  10  8  7     9  10  8  9  8     9  10  10 10 8     7   7  9   10  10
ratio  row R1
*2     concave   8.5 7  7  7  8.5  10  10  10  8.5 7    8.5 10  8.5 8.5 8.5 8.5 10 10 10 8.5 7     7   8.5 10  10
       row R2
       concave   9   7  7  7  8    10  10  10  9  7     8  10  9  8  9     8  10  10 10 9     7   7  8   10  10
       row R3
```

```
                                              Number of segments
Segment type                30                35              40              45              50
     *1          B  A  A  B  A     B  A  A  A  B     B  B  B  A  B     B  A  A  A  B     B  A  A Pitch  concave   8   7  9  8  9    8   7  7  7  9     10  10  10  8  9     10  8  7  7  9     10  10  8  7  9
ratio  row R1
*2     concave   8.5 7  8.5 8.5 8.5 8.5 7  7  7  8.5  10  10  10  8.5 8.5 10  8.5 7 7 8.5 10  10  8.5 7  8.5
       row R2
       concave   9   7  8  9  8     9  7  7  7  8     10  10  10  9  8     10  9  7  7  8     10  10  9  7  8
       row R3
```

```
                                              Number of segments
       Segment type            55                60                65                70
            *1        B  B  A  A  B    B  A  A  A  B     A  B  B  B  A     B  A  A  B  B Pitch  concave        10  8  7  9  10    8  7  7  7  9     8  9  8  9  10    10  8  9  8   7  9  10  10
ratio  row R1
*2     concave        10  8.5 7  8.5 10  8.5 7  7  8.5 8.5 8.5 8.5 8.5 10    10  8.5 8.5 8.5 7  8.5 10  10
       row R2
       concave        10  9  7  8  10   9   7  7  7  8     9  8  9  8  10    10  9  8  9    7  8  10  10
       row R3
```

(Note)
*1 Circumferential length ratio of segment types A:B = 7:10
*2 Pitch ratio every concave row when maximum value of each concave row is 10.

TABLE 3

Invention mold 2: segment shape: FIG. 5

| | | Number of segments | | | | | | | | | | | | | | | | | | | | | | | |
|---|---|---|---|---|---|---|---|---|---|---|---|---|---|---|---|---|---|---|---|---|---|---|---|---|---|
| | | | | | 5 | | | | | 10 | | | | | 15 | | | | | 20 | | | | | 25 |
| Segment type *1 | | B | A | A | A | A | B | B | B | B | A | A | B | B | A | B | A | B | B | B | B | A | A | B | B | B |
| Pitch ratio *2 | concave row $R_1$ | 8 | 7 | 7 | 7 | 9 | 10 | 10 | 10 | 8 | 7 | 9 | 10 | 8 | 9 | 8 | 9 | 10 | 10 | 10 | 8 | 7 | 7 | 9 | 10 | 10 |
| | concave row $R_2$ | 8.5 | 7 | 7 | 7 | 8.5 | 10 | 10 | 10 | 8.5 | 7 | 8.5 | 10 | 8.5 | 8.5 | 8.5 | 8.5 | 10 | 10 | 10 | 8.5 | 7 | 7 | 8.5 | 10 | 10 |
| | concave row $R_3$ | 8 | 7 | 7 | 7 | 9 | 10 | 10 | 10 | 8 | 7 | 9 | 10 | 8 | 9 | 8 | 9 | 10 | 10 | 10 | 8 | 7 | 7 | 9 | 10 | 10 |

| | | Number of segments | | | | | | | | | | | | | | | | | | | | | | | |
|---|---|---|---|---|---|---|---|---|---|---|---|---|---|---|---|---|---|---|---|---|---|---|---|---|---|
| | | 30 | | | | 35 | | | | | 40 | | | | | 45 | | | | | 50 | | | | |
| Segment type *1 | | B | A | A | B | A | B | A | A | A | B | B | B | A | B | B | A | A | B | B | B | A | A |
| Pitch ratio *2 | concave row $R_1$ | 8 | 7 | 9 | 8 | 9 | 8 | 7 | 7 | 7 | 9 | 10 | 10 | 10 | 8 | 9 | 10 | 8 | 7 | 7 | 9 | 10 | 10 | 8 | 7 | 9 |
| | concave row $R_2$ | 8.5 | 7 | 8.5 | 8.5 | 8.5 | 8.5 | 7 | 7 | 7 | 8.5 | 10 | 10 | 10 | 8.5 | 8.5 | 10 | 8.5 | 7 | 7 | 8.5 | 10 | 10 | 8.5 | 7 | 8.5 |
| | concave row $R_3$ | 8 | 7 | 9 | 8 | 9 | 8 | 7 | 7 | 7 | 9 | 10 | 10 | 10 | 8 | 9 | 10 | 8 | 7 | 7 | 9 | 10 | 10 | 8 | 7 | 9 |

| | | Number of segments | | | | | | | | | | | | | | | | | | | |
|---|---|---|---|---|---|---|---|---|---|---|---|---|---|---|---|---|---|---|---|---|---|
| | | | 55 | | | | | 60 | | | | | 65 | | | | | 70 | | | |
| Segment type *1 | | B | B | A | A | B | B | A | A | A | B | A | B | A | B | B | B | A | B | A | B | B |
| Pitch ratio *2 | concave row $R_1$ | 10 | 8 | 7 | 9 | 10 | 8 | 7 | 7 | 9 | 8 | 9 | 8 | 9 | 10 | 10 | 8 | 9 | 8 | 7 | 9 | 10 | 10 |
| | concave row $R_2$ | 10 | 8.5 | 7 | 8.5 | 10 | 8.5 | 7 | 7 | 8.5 | 8.5 | 8.5 | 8.5 | 8.5 | 10 | 10 | 8.5 | 8.5 | 8.5 | 7 | 8.5 | 10 | 10 |
| | concave row $R_3$ | 10 | 8 | 7 | 9 | 10 | 8 | 7 | 7 | 9 | 8 | 9 | 8 | 9 | 10 | 10 | 8 | 9 | 8 | 7 | 9 | 10 | 10 |

(Note)
*1 Circumferential length ratio of segment types A:B = 7:10
*2 Pitch ratio every concave row when maximum value of each concave row is 10.

TABLE 4

Invention mold 3: segment shape: FIG. 5

| | | Number of segments | | | | | | | | | | | | | | | | | | | | | | | |
|---|---|---|---|---|---|---|---|---|---|---|---|---|---|---|---|---|---|---|---|---|---|---|---|---|---|
| | | | | | 5 | | | | | 10 | | | | | 15 | | | | | 20 | | | | | 25 |
| Segment type *1 | | C | B | B | C | A | A | A | B | C | B | A | A | C | B | C | C | B | B | B | B | C | A | A | C |
| Pitch ratio *2 | concave row $R_1$ | 9 | 8.5 | 9.5 | 8 | 7 | 7 | 7 | 8 | 9.5 | 9 | 7.5 | 7 | 9 | 9 | 9.5 | 10 | 9 | 8.5 | 8.5 | 8.5 | 9.5 | 8 | 7 | 9 | 9 |
| | concave row $R_2$ | 9.25 | 8.5 | 9.25 | | 7 | 7 | 7 | | 9.25 | | 7.75 | | 8.5 | | 9.25 | | 9.25 | 8.5 | 8.5 | | 9.25 | | | 8.5 | 9.25 |
| | | | 8.5 | | 7.75 | | | 7 | | | 7.75 | | | 9.25 | | | 7 | | | 9.25 | | | 10 | | 8.5 | 8.5 | 7.75 | | 8.5 |
| | concave row $R_3$ | 9 | 8.5 | 9.5 | 8 | 7 | 7 | 7 | 8 | 9.5 | 9 | 7.5 | 7 | 9 | 9 | 9.5 | 10 | 9 | 8.5 | 8.5 | 8.5 | 9.5 | 8 | 7 | 9 | 9 |

| | | Number of segments | | | | | | | | | | | | | | | | | | | | | | | |
|---|---|---|---|---|---|---|---|---|---|---|---|---|---|---|---|---|---|---|---|---|---|---|---|---|---|
| | | | | | 30 | | | | | 35 | | | | | 40 | | | | | 45 | | | | | 50 |
| Segment type *1 | | B | B | C | C | C | B | C | C | C | B | B | C | C | C | C | A | A | C | B | A | A | B | A | B | C |
| Pitch ratio *2 | concave row $R_1$ | 8.5 | 9.5 | 10 | 10 | 9 | 9.5 | 10 | 10 | 9 | 8.5 | 9.5 | 10 | 10 | 10 | 8 | 7 | 9 | 9 | 7.5 | 7 | 8 | 7.5 | 8 | 9.5 | 9 |
| | concave row $R_2$ | | 8.5 | | 10 | | 9.25 | | 10 | | 9.25 | 9.25 | | 10 | | 7.75 | 8.5 | 7.75 | | 7.75 | | 7.75 | | 9.25 | | |
| | | | | 9.25 | | 10 | | 9.25 | | 10 | | 8.5 | | 10 | | 10 | | 7 | | 9.25 | | 7 | | 7.75 | | | 9.25 |
| | concave row $R_3$ | 8.5 | 9.5 | 10 | 10 | 9 | 9.5 | 10 | 10 | 9 | 8.5 | 9.5 | 10 | 10 | 10 | 8 | 7 | 9 | 9 | 7.5 | 7 | 8 | 7.5 | 8 | 9.5 | 9 |

TABLE 4-continued

Invention mold 3:segment shape:FIG. 5

|  |  | Number of segments | | | | | | | | | | | | | | | |
|---|---|---|---|---|---|---|---|---|---|---|---|---|---|---|---|---|---|
|  |  | 55 | | | | | | 60 | | | | | | 65 | | | |
| Segment type *1 | | B | A | B | A | A | A | A | B | A | A | A | B | B | B | A | B |
| Pitch ratio *2 | concave row R₁ | 7.5 | 8 | 7.5 | 7 | 7 | 7 | 8 | 7.5 | 7 | 7 | 8 | 8.5 | | 8.5 | 7.5 | 8 | 9.5 |
|  | concave row R₂ | 7.75 | | 7.75 | | 7 | | 7.75 | | 7 | | 7.75 | | | 8.5 | | 7.75 | |
|  |  | | 7.75 | | 7 | | 7 | | 7.75 | | 7 | | | 8.5 | | 7.75 | | 9.25 |
|  | concave row R₃ | 7.5 | 8 | 7.5 | 7 | 7 | 7 | 8 | 7.5 | 7 | 7 | 8 | 8.5 | 8.5 | 7.5 | 8 | | 9.5 |

(Note)
*1 Circumferential length ratio of segment types A:B:C = 7:8.5:10
*2 Pitch ratio every concave row when maximum value of each concave row is 10.

Each of the thus obtained tires is assembled onto a rim of 7J×16 and inflated under an internal pressure of 2.2 kgf/cm² and then mounted onto a four-wheel-drive vehicle having a displacement of 4000 cc. Then, the vehicle is actually run under a load of two passengers to measure tire noise. The measurement is carried out by a driver's feeling (driver's seat side) on indoor sound when the vehicle is inertially run from a speed of 70 km/h on a straight smooth road and by a sound-level meter disposed near to a right ear of the driver.

The measured results are shown in Table 5.

TABLE 5

| Mold used | Conventional mold | Invention mold 1 | Invention mold 2 | Invention mold 3 |
|---|---|---|---|---|
| Feeling evaluation | 6 | 7 | 6.75 | 6.5 |
| Value of meter dB (A) | 70 | 68 | 69 | 69.5 |

According to the invention, there can be provided a mold capable of advantageously realizing the formation of pitch variation based on intervals between lug grooves by using segments of about 2 to 4 types, so that tire noise can be reduced even in tires having a lug type or rib-lug type tread pattern which have never developed the pitch variation effect in the conventional technique.

What is claimed is:

1. A vulcanization mold for producing a tire having a tread pattern formed by defining land portions by at least one circumferential groove extending along a circumference of a tread and both tread ends and arranging many lug grooves extending in a direction across the circumferential groove in each of the land portions in a circumferential direction of the tread, wherein the mold is segmented by partition lines each extending in parallel to a widthwise direction of the mold at a position excluding a protrusion for the formation of the lug groove in the tread pattern and constructed by arranging and combining many segments, each of which segments being defined between the adjacent partition lines and having a similar telescopic shape of n different types in the circumferential direction, wherein n is an integer of 2 to 4; and the number of types of pitches each defined as a distance between the protrusions of the adjacent combined segments is at least n+1 on the same circumference line; and a difference of pitch between different combinations of adjacent segments of different similar telescopic shapes is always not less than 0.5 when the pitch between protrusions of the combined segments is represented by an index of a pitch ratio on the basis that a maximum value of the pitch is 10.

2. A vulcanization mold according to claim 1, wherein when the protrusion is disposed in a concave portion of the segment forming a land portion of a tread, a ratio of circumferential length a from a center of the protrusion in longitudinal direction to a partition line defining the segment to circumferential length b from this center to another partition line defining the segment differs between adjoining concave portions in at least a widthwise direction of the segment.

* * * * *